(12) United States Patent
Voss

(10) Patent No.: US 8,641,153 B2
(45) Date of Patent: Feb. 4, 2014

(54) VALVE ASSEMBLY

(75) Inventor: Christoph Voss, Frankfurt am Main (DE)

(73) Assignee: Continental Teves AG & Co. oHG (DE)

( * ) Notice: Subject to any disclaimer, the term of this patent is extended or adjusted under 35 U.S.C. 154(b) by 403 days.

(21) Appl. No.: 12/530,352

(22) PCT Filed: Feb. 19, 2008

(86) PCT No.: PCT/EP2008/051960
§ 371 (c)(1),
(2), (4) Date: Sep. 8, 2009

(87) PCT Pub. No.: WO2008/110437
PCT Pub. Date: Sep. 18, 2008

(65) Prior Publication Data
US 2010/0072812 A1    Mar. 25, 2010

(30) Foreign Application Priority Data

Mar. 10, 2007  (DE) .......................... 10 2007 011 768
Sep. 12, 2007  (DE) .......................... 10 2007 043 554

(51) Int. Cl.
*B60T 8/36* (2006.01)

(52) U.S. Cl.
USPC .... 303/119.3; 303/20; 303/113.1; 303/113.2; 303/116.1; 303/119.2; 137/269; 137/315.01; 137/315.03; 251/129.02; 251/129.08; 251/129.15; 335/270; 335/274

(58) Field of Classification Search
USPC .......... 303/119.3, 7; 251/129.15; 137/315.01, 137/315.03, 269; 335/270, 274

IPC ........................................................ F16K 17/04
See application file for complete search history.

(56) References Cited

U.S. PATENT DOCUMENTS

| | | | | |
|---|---|---|---|---|
| 3,829,060 A * | 8/1974 | von Lewis | ............... | 251/129.02 |
| 4,951,703 A * | 8/1990 | Brehm et al. | ............ | 137/315.03 |
| 5,088,520 A | 2/1992 | Haynes et al. | | |
| 5,232,197 A | 8/1993 | Kalippek et al. | | |
| 5,333,836 A * | 8/1994 | Fukuyo et al. | ........... | 251/129.15 |
| 5,423,347 A | 6/1995 | Weber | | |
| 5,975,654 A * | 11/1999 | Zaviska et al. | ............. | 303/119.2 |
| 6,269,834 B1 | 8/2001 | Huhnen | | |
| 6,684,901 B1 | 2/2004 | Reilly et al. | | |
| 2002/0104572 A1* | 8/2002 | Sen | .......................... | 137/625.65 |
| 2005/0231033 A1* | 10/2005 | Ganzel | ......................... | 303/152 |

(Continued)

FOREIGN PATENT DOCUMENTS

| | | |
|---|---|---|
| DE | 2 208 183 | 8/1973 |
| DE | 2 246 624 | 3/1974 |

(Continued)

*Primary Examiner* — Robert A Siconolfi
*Assistant Examiner* — San Aung
(74) *Attorney, Agent, or Firm* — RatnerPrestia

(57) ABSTRACT

A valve assembly, which houses a valve closing member that co-operates with an armature to connect or separate pressure medium channels in a valve housing, the member being directed towards a valve seat which is situated on a valve seat body fixed in the valve housing. The valve assembly includes a solenoid for actuating the armature which is pushed onto a non-magnetisable sleeve section of the valve housing and a magnetic core that is diametrically opposed to the armature in the valve housing. Various valve functions can be achieved by using identical valve components in a modular manner.

20 Claims, 2 Drawing Sheets

(56) References Cited

U.S. PATENT DOCUMENTS

| | | |
|---|---|---|
| 2006/0237672 A1 * | 10/2006 | Moreno et al. ........... 251/129.02 |
| 2007/0145314 A1 | 6/2007 | Hillesheim |
| 2008/0224534 A1 * | 9/2008 | Schnalzger et al. ....... 303/119.3 |

FOREIGN PATENT DOCUMENTS

| | | |
|---|---|---|
| DE | 29 28 611 A1 | 2/1981 |
| DE | 40 31 885 A1 | 4/1992 |
| DE | 40 38 762 A1 | 6/1992 |
| DE | 41 35 993 A1 | 12/1992 |
| DE | 195 34 285 A1 | 3/1997 |
| DE | 197 07 587 A1 | 8/1998 |
| DE | 198 10 330 A1 | 9/1999 |
| DE | 199 32 747 A1 | 4/2000 |
| DE | 103 22 585 A1 | 12/2004 |
| DE | 10 2005 058 846 A1 | 6/2007 |
| DE | 10 2006 011 078 A1 | 9/2007 |
| GB | 1 450 402 | 9/1976 |
| GB | 1 536 689 | 12/1978 |
| WO | WO 92/09836 | 6/1992 |
| WO | WO 2005/108840 A1 | 11/2005 |

\* cited by examiner

VALVE ASSEMBLY

CROSS REFERENCE TO RELATED APPLICATIONS

This application is the U.S. National Phase Application of PCT International Application No. PCT/EP2008/051960, filed Feb. 19, 2008, which claims priority to German Patent Application No. DE102007011768.1, filed Mar. 10, 2007 and German Patent Application No. DE102007043554.3, filed Sep. 12, 2007, the contents of such applications being incorporated by reference herein.

FIELD OF THE INVENTION

The invention relates to a valve assembly.

BACKGROUND OF THE INVENTION

As a rule, in order to perform different valve functions, widely differing valve assemblies with components specially designed for the particular function are developed, which adversely affects manufacturing costs.

SUMMARY OF THE INVENTION

It is an object of the present invention to develop a valve assembly for different valve functions which does not have the aforementioned disadvantages.

This object is achieved according to aspects of the invention, for a valve assembly of the type stated.

Further features and advantages of the invention are apparent from the following description of several exemplary embodiments.

With reference to FIGS. 1-4, four valve assemblies with different functions are shown which each have a valve-closing member 13 which cooperates with an armature 4 to connect or separate pressure medium channels in a valve housing, which valve-closing member 13 is directed towards a valve seat which is arranged on a valve seat body 3 fixed in the valve housing. Each valve assembly further has a solenoid 16 for actuating the armature 4, which solenoid 16 is fitted onto a non-magnetizable sleeve section 1 of the valve housing. Located diametrically opposite the armature 4 in each case is a magnetic core 5 which is inserted in the valve housing and, depending on the valve function, is either fitted into the end of the valve housing as the closing plug 6 or is positioned inside the valve housing between the armature 4 and a valve seat body 3. According to the representation, all the valve assemblies illustrated have a cartridge-type configuration and are fastened in a block-type valve-receiving body 11 by means of caulking the block material from the outside in the direction of a collar provided on the valve housing (tubular body 2).

Apart from the particular details of the valve assemblies illustrated in FIGS. 1-4, which are used in driving dynamics control systems, the invention provides in general terms that different valve functions can be performed using as many identical valve components as possible in a modular manner. This leads to a significant reduction in manufacturing cost while preserving the multi-functionality of all the valve assemblies.

With a view to using diverse valve assemblies in vehicle dynamics control systems, universally applicable valve housing components 1, 2 are therefore used as identical valve components for all the necessary valve functions, within which valve housing components 1, 2 the armature 4, the magnetic core 5 and the valve seat body 3 are arranged as in the examples in FIGS. 1-4.

In order to perform the different valve functions at a cost as low as possible, the identical valve housing components 1, 2 have uniform internal and external diameters and a constant length, for which reason the identical valve housing components each consist, for all the valve assemblies illustrated, of a thin-walled, non-magnetizable sleeve section 1 and a thick-walled, magnetizable tubular body 2; in order to receive the armature 4 and the magnetic core 5 in the valve housing, the external diameter of the armature 4 and the external diameter of the magnetic core 5 are adapted to the internal diameter of the valve housing components 1, 2 in dependence on the desired valve function.

In this case the internal circumference of the end of the sleeve section 1 oriented towards the tubular body 2 is fastened with zonal overlap, non-positively and by a material joint in the form of a welded connection, to the external circumference of the tubular body 2, while the end of the sleeve section 1 oriented away from the tubular body 2 is fastened, likewise non-positively by means of a press fit and by a material joint in the form of a welded connection, to the outer circumference of a magnetizable closing plug 6 which is universally applicable for different basic valve functions.

The external contour of the closing plug 6, in particular the external diameter and length thereof, are constant, independently of the desired valve function in each case, while the internal contour of the closing plug 6 is adapted to the particular valve function to be performed.

It follows from the above that the closing plug 6, in order to perform the valve function of a valve assembly which is closed in the electromagnetically non-excited state, has a thick-walled configuration as a magnetic pole, regarding which reference is made to FIGS. 1 and 2.

In contrast, FIGS. 3 and 4 show two valve assemblies in which the closing plug 6, in order to perform the valve function of a valve which is open in the electromagnetically non-excited state, has in each case an internal contour as thin-walled as possible, and is preferably configured in the form of a cap in which the armature 4 is advantageously insertable. Formed on the base of the cap in each case is a bearing 8 in which a plunger 7 projecting from the armature 4 is precisely guided, whereby the armature 4 is also precisely centered at one end inside the sleeve section 1.

A further contribution to the constructional standardization of all the functionally different valve assemblies is made by the valve seat body 3 which, like the valve housing components 1, 2, is configured as a universally applicable pressed-in part, in order to be able to achieve all the different desired valve functions. For this purpose the outer contour of the valve seat body 3 has a collar 9 for limiting and maintaining the pressed-in depth in the tubular body 2, which collar 9 bears preferably against a housing step 10 of a valve-receiving body 11, at the end of the tubular body 2 oriented away from the sleeve section 1. The valve seat body 3 is pressed-in in a liquid-tight manner in the end region of the tubular body 2 oriented away from the sleeve section 1, the projection of which valve seat body 3 extending from the tubular body 2 has a radial sealing face provided with a plurality of grooves or with a saw-tooth structure which is insertable in a liquid-tight manner in a stepped valve-receiving bore 12 of the valve-receiving body 11.

For all the embodiments illustrated it is the case that, for the purpose of minimizing manufacturing cost, the armature 4 and the magnetic core 5 are configured as cold-formed or extruded parts and the sleeve section 1 as a deep-drawn part, while the tubular body 2 is produced in each case from a cold-formed or turned part.

As a result of the use of identical valve components, and therefore of the practically identical assembly process for all the functionally different valve assemblies to be produced, the production lines required hitherto can be simplified yet utilized very flexibly, since all the different valve assemblies can already be produced on a single production line without significant additional complexity and cost.

All the valve assemblies illustrated in FIGS. 1-4 are configured in such a way that, as a result of the magnetizable closing plug 6, no attenuation of the magnetic circuit occurs, since the yoke part of the solenoid directly contacts the closing plug 6 and the magnetic disk resting against the yoke part also rests directly against the magnetizable tubular body 2. As a result of the valve housing identical for all valve assemblies, a single solenoid 16 with the associated yoke part and the associated magnetic disk 17 can be used for all the functionally different valve assemblies.

To the extent that all the further details represented in FIGS. 1-4 have not been explained up to now, a description of them now follows.

DETAILED DESCRIPTION OF THE PREFERRED EMBODIMENT

Figure 1:
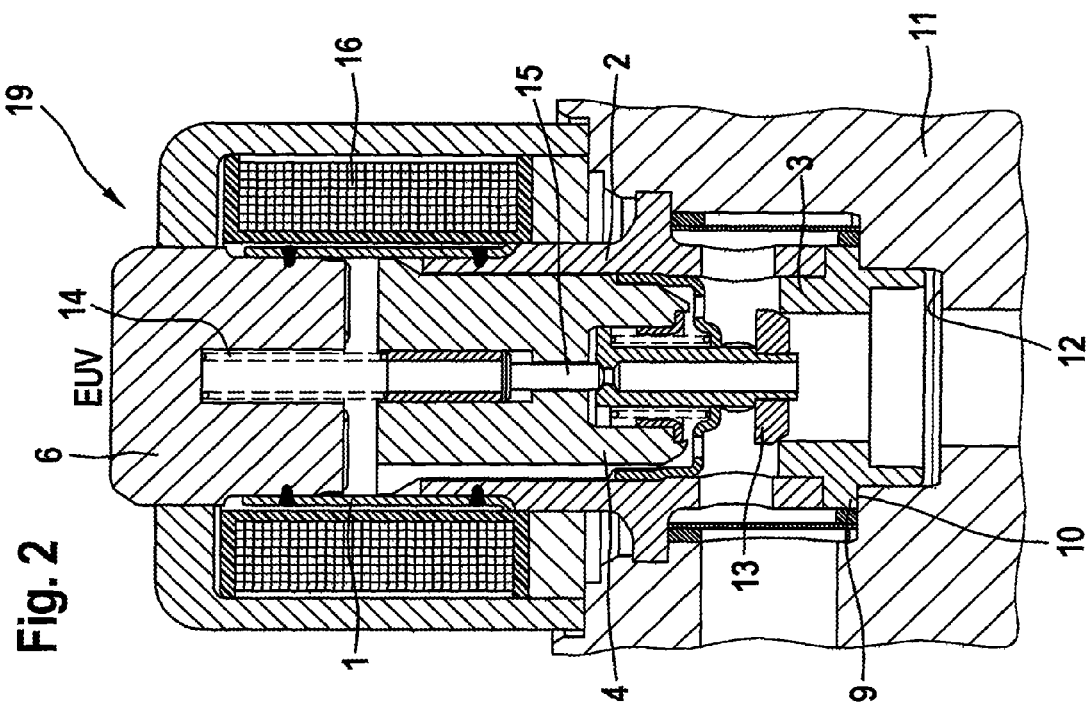
FIG. 1 shows in longitudinal section a valve assembly in the form of a 2/2-way seat solenoid valve which is in its electromagnetically currentless closed switching position in which the valve-closing member remains on the valve seat.

FIG. 1 shows in longitudinal section a valve assembly in the form of a 2/2-way seat solenoid valve which is in its electromagnetically currentless closed switching position in which the valve-closing member 13 remains on the valve seat. This valve base position is produced by a compression spring 14 arranged between the armature 4 and the closing plug 6, a section of which compression spring 14 is received inside a blind bore of the closing plug 6. In the electromagnetically excited state the armature 4 comes into abutment against the closing plug 6 acting as a magnetic pole, so that the valve-closing member 13 is lifted from the valve seat. The valve assembly represented is used as an outlet valve downstream of the wheel brake of a driving dynamics control system.

Figure 2:
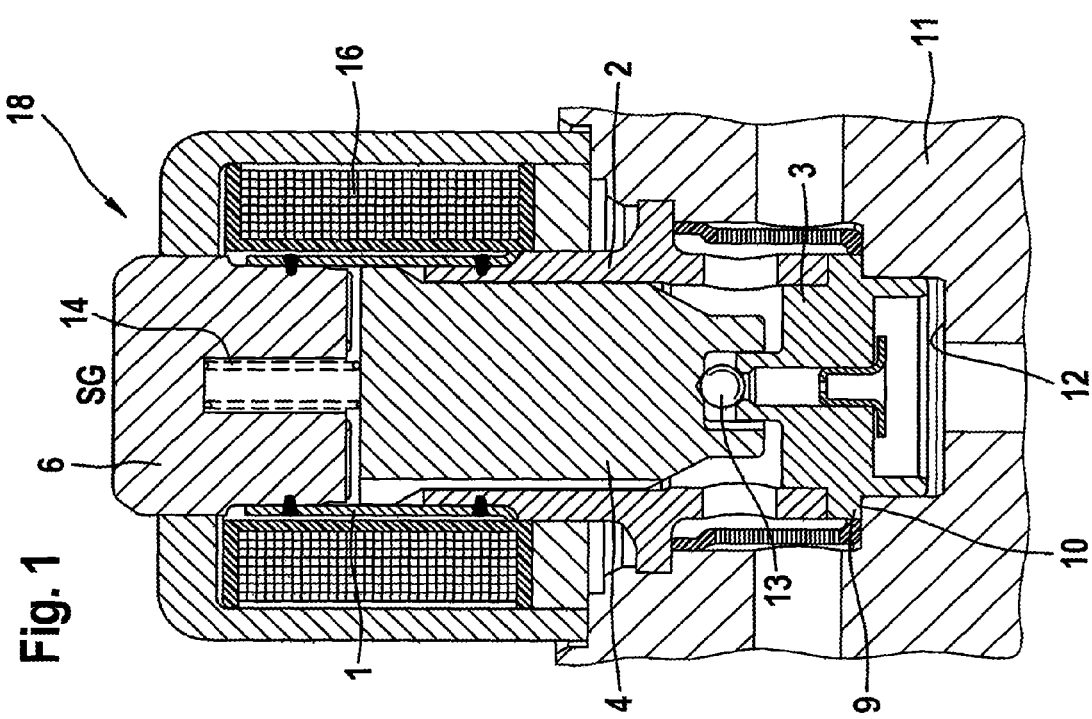
FIG. 2 shows in longitudinal section a valve assembly in the form of a solenoid valve which is in its electromagnetically currentless closed switching position.

FIG. 2 shows in longitudinal section a valve assembly in the form of a solenoid valve which is in its electromagnetically currentless closed switching position, in which both serially arranged valve-closing members 13, 15 remain on their valve seats. This valve base position is also produced by a compression spring 14 arranged between the armature 4 and the closing plug 6, a section of which compression spring 14 is received inside a blind bore of the closing plug 6. In the electromagnetically excited state the armature 4 comes into abutment against the closing plug 6 acting as a magnetic pole, whereby both valve-closing members 13, 15 lift successively from their valve seats in a two-stage function and successively enable different opening cross sections within a pilot and main valve stage in the valve housing. The valve assembly shown is used as an electromagnetically pilot-controlled reversing valve (two-stage valve) between a return pump and a brake master cylinder of a driving dynamics control system.

Figure 3:
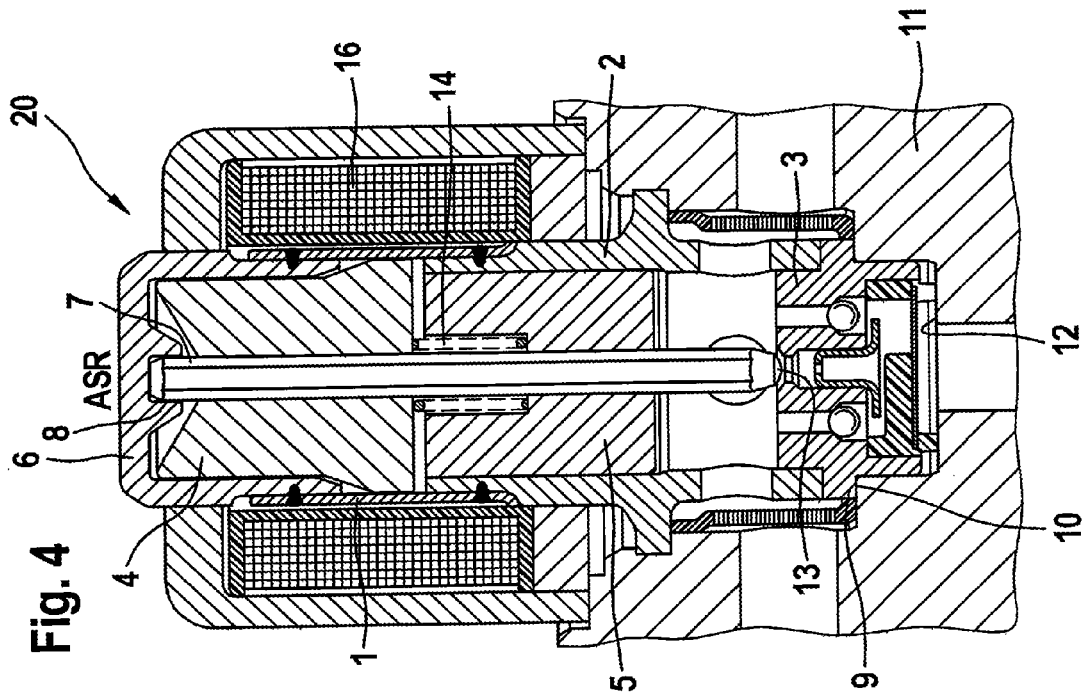
FIG. 3 shows in longitudinal section a valve assembly in the form of a solenoid valve which is in its electromagnetically currentless open switching position in which the valve-closing member is lifted from the valve seat.

FIG. 3 shows in longitudinal section a valve assembly in the form of a solenoid valve which is in its electromagnetically currentless open switching position in which the valve-closing member 13 is lifted from the valve seat. This valve base position is produced by a compression spring 14 arranged between the armature 4 and the magnetic core 5, a section of which compression spring 14 is received inside a blind bore of the magnetic core 5. In the electromagnetically excited state the armature 4 comes into abutment against the magnetic core 5, so that the valve-closing member 13 mounted on the plunger 7 comes into contact with the valve seat and interrupts the pressure medium connection. The armature 4 is guided precisely on both sides by means of the plunger 7 inside the magnetic core 5 and in the bearing 8 of the cap-shaped closing plug 6. The valve seat body 3 accommodates in a bypass bore a nonreturn valve which is partially covered by a stop plate provided with a screen, so that the nonreturn valve is prevented from falling out. The screen is a component of a sleeve body which is pressed into a bore of the valve seat body 3 adjacent to the valve seat. The valve assembly shown is used as an inlet valve upstream of the wheel brake of a driving dynamics control system.

Figure 4:
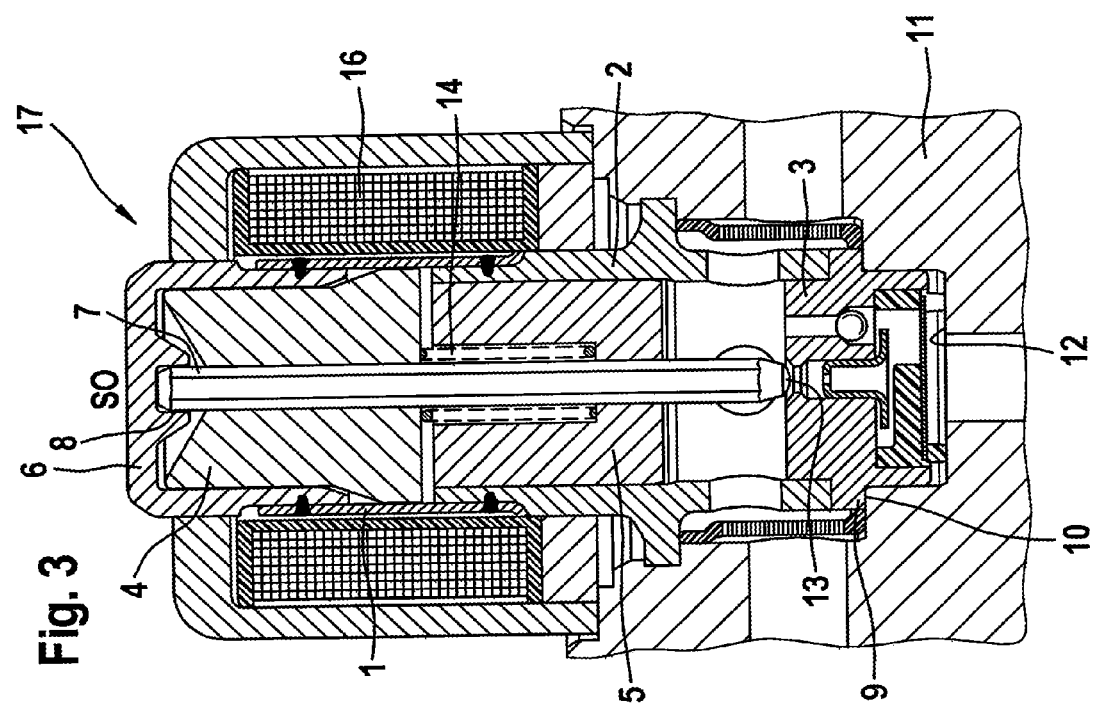
FIG. 4 shows the valve assembly already known from FIG. 3 with a construction identical in principle but with the special feature that this solenoid valve is used as an ASR valve between the brake master cylinder and the pump pressure side in the brake line section of a driving dynamics control valve leading to the inlet valve.

Finally, FIG. 4 shows the valve assembly already known from FIG. 3 with a construction identical in principle but with the special feature that this solenoid valve is used as an ASR valve between the brake master cylinder and the pump pressure side in the brake line section of a driving dynamics control valve leading to the inlet valve.

The invention claimed is:

1. A valve assembly which houses a valve-closing member that cooperates with an armature to connect or separate pressure medium channels in a valve housing, said valve-closing member being directed towards a valve seat which is arranged on a valve seat body fixed on the valve housing,
   a solenoid for actuating the armature, wherein said solenoid is contained within a yoke that is fitted onto the valve housing,
   a magnetic core which is inserted in the valve housing opposite the armature such that the armature is biased in a direction away from the magnetic core,
   a magnetizable tubular body including an aperture that at least partially defines the pressure medium channels, said magnetizable tubular body being separate from the valve housing and the valve seat body and mounted to both the valve housing and the valve seat body, said magnetizable tubular body defining an interior region in which either the magnetic core or the armature is at least partially positioned, and
   a non-magnetizable sleeve that is contained entirely within the yoke, said non-magnetizable sleeve defining an interior region in which the other of the magnetic core and the armature is at least partially positioned, wherein a top end of the non-magnetizable sleeve is positioned at an elevation beneath a top end of the solenoid, and a bottom end of the non-magnetizable sleeve is positioned at an elevation above a bottom end of the solenoid, a magnetizable closing plug that is mounted to the yoke to close one end of the valve assembly;

wherein a top end of the sleeve at least partially overlaps the magnetizable closing plug in an axial direction, and the magnetizable closing plug is positioned adjacent a top end of the solenoid, wherein a bottom end of the sleeve at least partially overlaps the magnetizable tubular body in the axial direction, and the magnetizable tubular body is positioned adjacent a bottom end of the solenoid, and wherein different valve functions can be performed with the use of identical valve housing components in a modular manner.

2. The valve assembly as claimed in claim 1, wherein the identical valve housing components are formed by universally applicable valve housing components inside which the armature, the magnetic core and the valve seat body are arranged.

3. The valve assembly as claimed in claim 1, wherein the identical valve housing components have a standardized internal and external diameter and a constant length for performing different valve functions.

4. The valve assembly as claimed in claim 1, wherein the identical valve housing components comprise the non-magnetizable sleeve, which is thin-walled, and the magnetizable tubular body, which is thick-walled, wherein an external diameter of the armature and an external diameter of the magnetic core are adapted to an internal diameter of the valve housing components in dependence on a desired valve function in order to accommodate the armature and the magnetic core in the valve housing.

5. The valve assembly as claimed in claim 4, wherein an end of the sleeve that is oriented towards the tubular body is fastened by an internal circumference of the sleeve non-positively and/or by a material joint to an external circumference of the tubular body with zonal overlap, wherein an end of the sleeve that is oriented away from the tubular body is fastened non-positively and/or by a material joint to an outer circumference of the magnetizable closing plug which is universally usable for different valve functions.

6. The valve assembly as claimed in claim 5, wherein an external contour of the closing plug is constant for different valve functions, while an internal contour of the closing plug is adapted to a valve function to be achieved in each case.

7. The valve assembly as claimed in claim 6, wherein an external diameter and length of the closing plug is constant.

8. The valve assembly as claimed in claim 6, wherein the closing plug has a thick-walled configuration as a magnetic pole in order to perform a valve function of a valve which is closed in an electromagnetically non-excited state.

9. The valve assembly as claimed in claim 6, wherein the internal contour of the closing plug has a thin-walled configuration in order to perform a valve function of a valve which is open in an electromagnetically non-excited state.

10. The valve assembly as claimed in claim 9, wherein the thin-walled configuration is provided in the form of a cap into which the armature is insertable.

11. The valve assembly as claimed in claim 10, wherein a bearing in which a plunger projecting from the armature is guided is formed on the base of the cap.

12. The valve assembly as claimed in claim 4, wherein the valve seat body is provided in the form of a pressed-in part which is universally applicable independently of different valve functions, an external contour of the pressed-in part having a collar for limiting and maintaining a pressed-in depth in the tubular body, which collar bears against a housing step of a valve-receiving body at an end of the tubular body that is oriented away from the sleeve.

13. The valve assembly as claimed in claim 4, wherein the valve seat body is pressed-in in a liquid-tight manner in an end region of the tubular body that is oriented away from the sleeve, a projection of the valve seat body extending from the tubular body having a radial sealing face provided with a plurality of grooves or with a saw-tooth structure which is insertable in a liquid-tight manner in a stepped valve-receiving bore of a valve-receiving body.

14. The valve assembly as claimed in claim 1, wherein the armature and the magnetic core are configured as cold-formed or extruded parts and the sleeve as a deep-drawn part.

15. The valve assembly as claimed in claim 4, wherein the tubular body is produced from a cold-formed or turned part.

16. A driving dynamics control system with a valve assembly as claimed in claim 1, wherein by a plurality of valve assemblies with different functions which are arranged in a plurality of valve series of a valve-receiving body, identical valve components being used in a plurality of valve-receiving bores.

17. The driving dynamics control system as claimed in claim 16, wherein in a first valve series of the valve-receiving body a first valve assembly assumes the function of an inlet valve which is open in an electrically currentless base position, and wherein in the second valve series a second valve assembly assumes the function of an outlet valve which is closed in an electrically currentless base position, and wherein in a third valve series a third valve assembly assumes the function of a drive-slip control valve which is open in an electrically currentless base position, wherein the valve housing components of the drive-slip control valve, which comprise the sleeve and the tubular body, are configured identically.

18. The driving dynamics control system as claimed in claim 17, wherein in the third valve series a third valve assembly assumes the function of a two-stage valve which is closed in an electrically currentless base position and wherein the valve housing components, comprising the sleeve and the tubular body, are configured identically to the first and second valve assemblies.

19. The valve assembly as claimed in claim 1, wherein the magnetic core and the magnetizable closing plug are integral components.

20. The valve assembly as claimed in claim 1, wherein the magnetic core and the magnetizable closing plug are separate components.

* * * * *